United States Patent
Morrison et al.

(10) Patent No.: US 11,960,833 B2
(45) Date of Patent: *Apr. 16, 2024

(54) SYSTEMS AND METHODS FOR USING MACHINE LEARNING MODELS TO ORGANIZE AND SELECT MODULAR COMPONENTS FOR USER INTERFACE TEMPLATES

(71) Applicant: Capital One Services, LLC, McLean, VA (US)

(72) Inventors: Mark Morrison, Plano, TX (US); Andrew Ricchuiti, Dallas, TX (US); Briana Shaver, Flower Mound, TX (US); Erin Edwards, The Colony, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/300,140

(22) Filed: Apr. 13, 2023

(65) Prior Publication Data

US 2023/0252232 A1    Aug. 10, 2023

Related U.S. Application Data

(63) Continuation of application No. 17/716,842, filed on Apr. 8, 2022, now Pat. No. 11,657,219, which is a continuation of application No. 17/495,377, filed on Oct. 6, 2021, now Pat. No. 11,366,963.

(51) Int. Cl.
*G06F 40/186* (2020.01)

(52) U.S. Cl.
CPC .................................. *G06F 40/186* (2020.01)

(58) Field of Classification Search
CPC ....................................................... G06F 40/186
See application file for complete search history.

(56) References Cited

U.S. PATENT DOCUMENTS

| | | | |
|---|---|---|---|
| 2008/0134018 A1* | 6/2008 | Kembel | H04L 41/22 707/E17.119 |
| 2019/0087519 A1* | 3/2019 | Mercury | G06F 30/20 |
| 2020/0259852 A1* | 8/2020 | Wolff | H04L 67/10 |
| 2022/0014547 A1* | 1/2022 | Hasan | G06N 5/025 |

* cited by examiner

*Primary Examiner* — Hassan Mrabi
(74) *Attorney, Agent, or Firm* — Perkins Coie LLP

(57) ABSTRACT

Methods and systems for using machine learning models to organize and select modular components for user interface templates. For example, the methods and systems may use machine learning and/or artificial intelligence to generate user interfaces with a preferred number of user input fields and/or pages, in which the preferred number both satisfies any requirements for the user interface (e.g., information, categories of information, etc.), and ensures that all privacy concerns are met.

20 Claims, 5 Drawing Sheets

From: [Select an Account ▸]

To: [Select an Account ▸] — 202

Amount: [$0.00]

Start On: [3/15/2019] — 204

End On: [3/16/2019]  ☐ Unlimited

Memo: [        ]

[Review]   Cancel

FIG. 2

SYSTEMS AND METHODS FOR USING MACHINE LEARNING MODELS TO ORGANIZE AND SELECT MODULAR COMPONENTS FOR USER INTERFACE TEMPLATES

CROSS-REFERENCE TO RELATED APPLICATION(S)

This application is a continuation of U.S. patent application Ser. No. 17/716,842, filed Apr. 8, 2022, which is a continuation of U.S. patent application Ser. No. 17/495,377, filed Oct. 6, 2021, which is incorporated herein in its entirety by reference.

BACKGROUND

In recent years, users have transitioned away from manual data entry to online forms. These online forms typically require users to enter data into one or more input fields. In addition to being tedious, such data entry tasks may also be difficult for users operating mobile devices (which tend to have smaller, touch screen interfaces). A conventional way of overcoming this problem is through the storage of user data and the auto-population of this stored user data in one or more input fields. However, this approach has several drawbacks. First, each user interface and the one or more user input fields may be different. Moreover, even if the information is the same, the format of that data may differ from one application to another. Second, while some user information may be public, oftentimes, users must enter private data, or at least data that the user wishes to remain private. Accordingly, storing user data, particularly sensitive data, raises privacy concerns. Finally, users may wish for some data to be shared with some applications, while wishing that the same data is not shared with other applications. While privacy settings may prevent some unauthorized use, even these settings may be bypassed, and thus create a security risk.

SUMMARY

In light of the problems above, methods and systems are described herein for using machine learning models to organize and select modular components for user interface templates. For example, as opposed to the conventional solution to the aforementioned problems that rely on storing data and auto-populating that data into user input fields, these methods and systems aim to reduce the burden and tediousness of entering information into user interfaces by adjusting the user interfaces and/or user input fields themselves. For example, the methods and systems may use machine learning and/or artificial intelligence to generate user interfaces with a preferred number of user input fields and/or pages, in which the preferred number both satisfies any requirements for the user interface (e.g., information, categories of information, etc.), and ensures that all privacy concerns are met.

However, addressing the aforementioned problems in this manner creates a novel technical hurdle. Specifically, the system is required to determine a preferred number of user input fields and/or pages. A conventional approach to this problem would be to monitor previous user interactions with user interfaces; however, this fails to provide a definitive solution because a user is unlikely to enter data into the same user interface, same user input fields, same number of pages, and/or the same applications enough times to generate an adequate data sample. Furthermore, the data required may change both from application to application, and also over time as information about the user and/or a user account changes.

To overcome this novel technical hurdle, the system retrieves user profile data, which may include behavior characteristics and account characteristics, wherein the behavior characteristics indicate likely user behavior when interacting with user interfaces, and wherein the account characteristics indicate a current status of a category of information of the user account. As opposed to comparing this data directly (which may prove impossible due to the aforementioned differences), these methods and systems instead generate a feature input based on this information and any requirements of the user interface. This vectorized form of data provides an empirical look at the user's behavior, account characteristics, and system requirements, which may be compared, contrasted, and/or applied to different applications.

Once achieved, a second technical hurdle is presented, namely how to represent the preferred number of user input fields and/or pages. These methods and systems achieve this through the use of a plurality of modular components. These methods and systems may then organize and select modular components for user interface templates by identifying categories of components that are required, filtering out unnecessary components, and organizing the remaining components as necessary to meet the requirements of the user interface.

In some aspects, methods and systems for using machine learning models to organize and select modular components for user interface templates are described. For example, the system may retrieve a user profile corresponding to a user account for a user, wherein the user profile includes a behavior characteristic and an account characteristic, wherein the behavior characteristic indicates likely user behavior when interacting with user interfaces, and wherein the account characteristic indicates the current status of a category of information related to the user account. The system may determine template requirements for a user interface. The system may generate a first feature input based on the user profile and the template requirements. The system may input the first feature input into a machine learning model, wherein the machine learning model is trained to: determine a plurality of categories of account characteristics required to be populated to meet the template requirements; filter the plurality of categories based on whether any of the plurality of categories is populated by known account characteristics for user accounts retrieved from user profiles; and determine for the filtered plurality of categories a number of user input fields and a number of user interface pages based on known behavior characteristics for user accounts retrieved from user profiles. The system may receive from the machine learning model a first output, wherein the first output indicates, based on the first feature input, a preferred number of user input fields and a preferred number of user interface pages. The system may generate for display, on a user device, the user interface comprising the preferred number of user input fields and the preferred number of user interface pages.

Various other aspects, features, and advantages of the invention will be apparent through the detailed description of the invention, and the drawings attached hereto. It is also to be understood that both the foregoing general description and the following detailed description are examples, and not restrictive of the scope of the invention. As used in the specification and in the claims, the singular forms of "a,"

"an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

BRIEF DESCRIPTION OF THE DRAWINGS

FIG. 1 shows an illustrative user interface for presenting user interface templates using machine learning models to organize and select modular components, in accordance with one or more embodiments.

FIG. 2 shows an illustrative user interface based on selected modular components, in accordance with one or more embodiments.

DETAILED DESCRIPTION OF THE DRAWINGS

Figure 3:
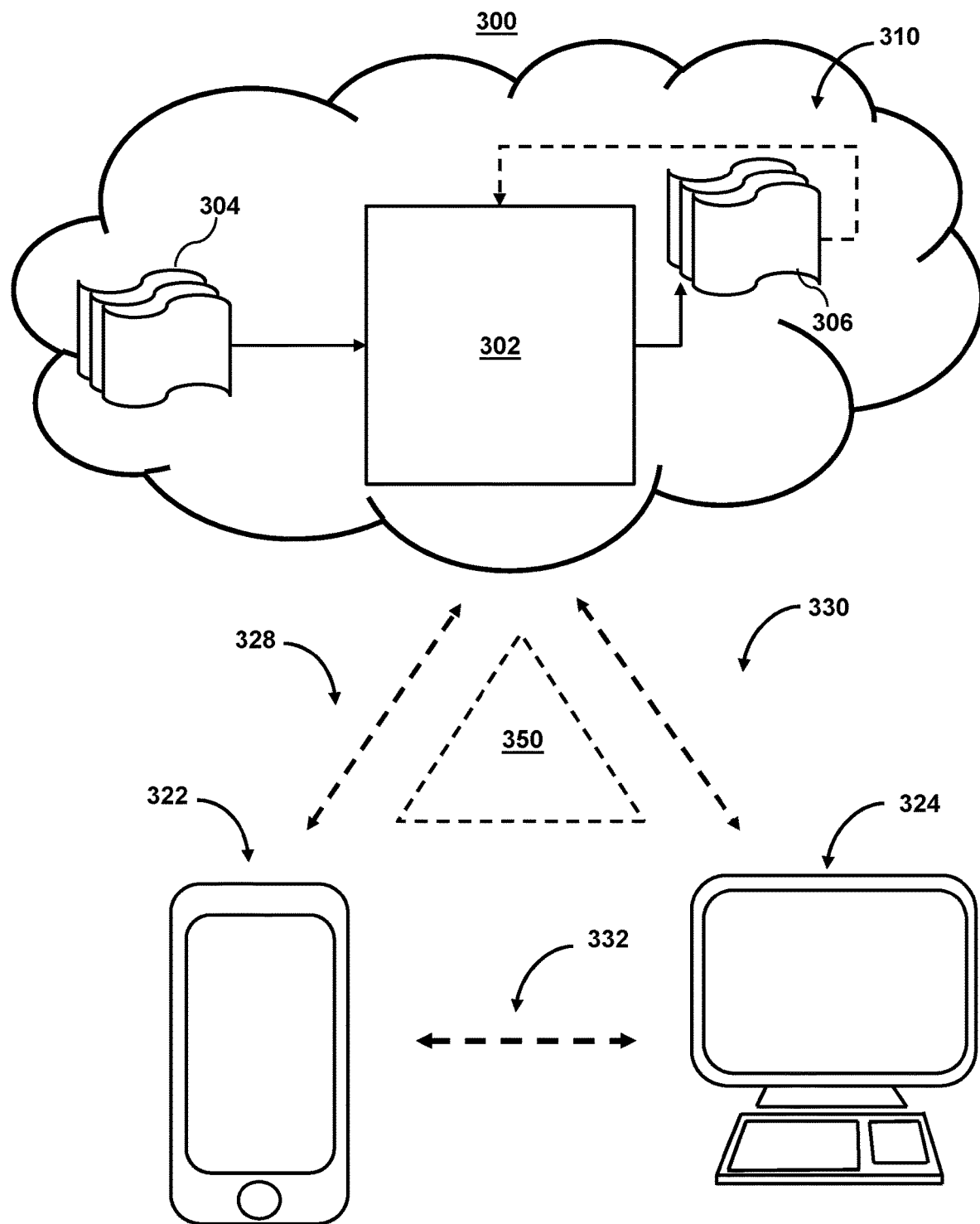
FIG. 3 shows illustrative system components for using machine learning models to organize and select modular components for user interface templates, in accordance with one or more embodiments.

In the following description, for the purposes of explanation, numerous specific details are set forth in order to provide a thorough understanding of the embodiments of the invention. It will be appreciated, however, by those having skill in the art, that the embodiments of the invention may be practiced without these specific details, or with an equivalent arrangement. In other cases, well-known structures and devices are shown in block diagram form in order to avoid unnecessarily obscuring the embodiments of the invention.

Figure 1:
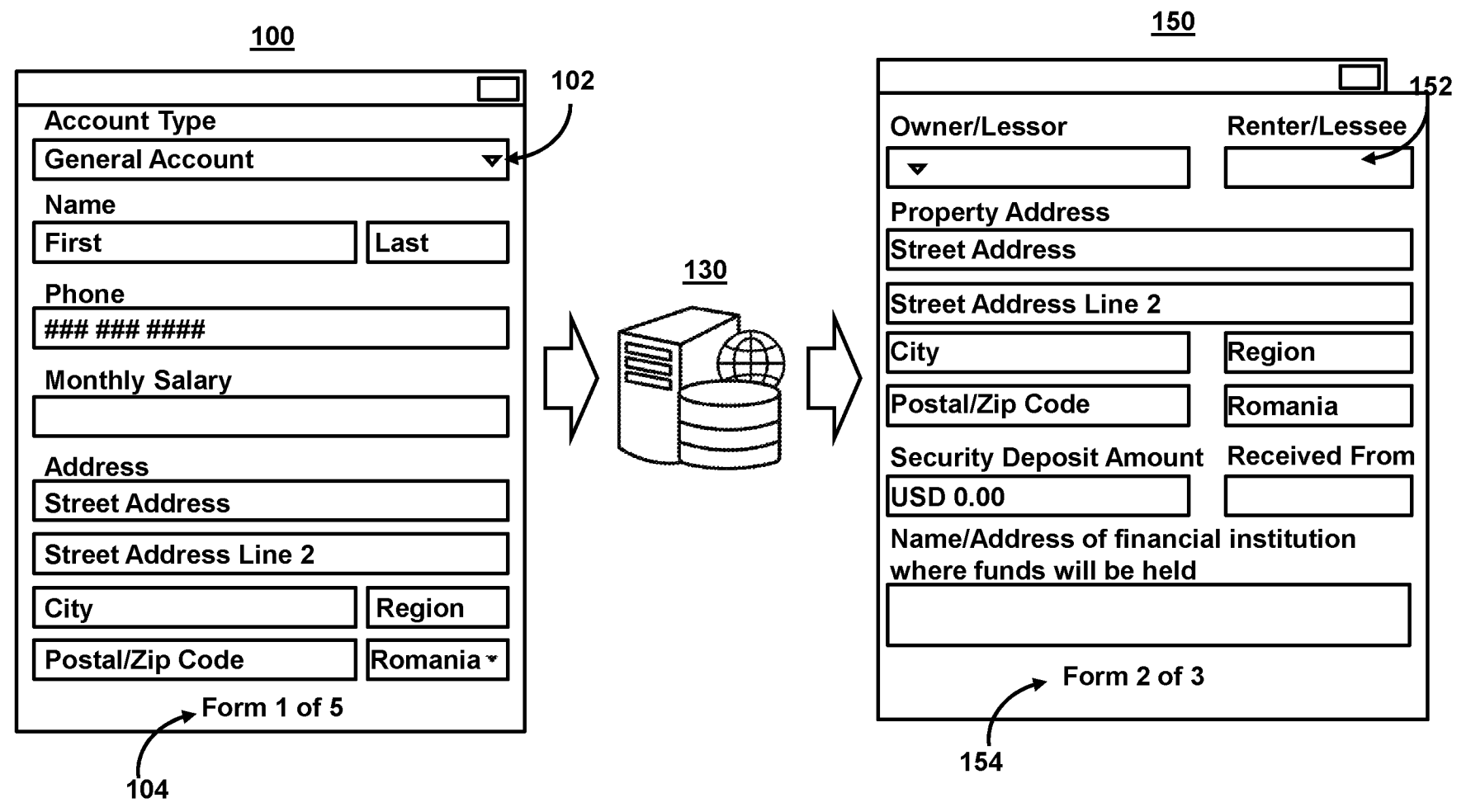

FIG. 1 shows an illustrative user interface for presenting user interface templates using machine learning models to organize and select modular components, in accordance with one or more embodiments. For example, FIG. 1 shows user interface 100 and user interface 150. The system (e.g., a mobile application) may generate and respond to user interactions in a user interface (e.g., user interface 100) in order to organize and select modular components user interface templates that are presented in user interfaces.

As referred to herein, a "user interface" may comprise a human-computer interaction and communication in a device, and may include display screens, keyboards, a mouse, and the appearance of a desktop. For example, a user interface may comprise a way a user interacts with an application or website. As referred to herein, "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. As referred to herein, the term "multimedia" should be understood to mean content that utilizes at least two different content forms described above, for example, text, audio, images, video, or interactivity content forms. Content may be recorded, played, displayed, or accessed by user equipment devices, but can also be part of a live performance.

The system may generate user interfaces based on template requirements. Template requirements may be the one or more requirements or criteria for which the user interface requires information. In some embodiments, this may comprise one or more categories of information about a user that needs to be received. In some embodiments, this may require the receipt of one or more values of a given category. In some embodiments, this may require a certain percentage of information and/or a certain number of a plurality of categories of information.

In some embodiments, content may be personalized for a user based on the original content and user preferences (e.g., as stored in a user profile). A user profile may be a directory of stored user settings, preferences, and information for the related user account. For example, a user profile may have the settings for the user's installed programs and operating system. In some embodiments, the user profile may be a visual display of personal data associated with a specific user, or a customized desktop environment. In some embodiments, the user profile may be a digital representation of a person's identity. The data in the user profile may be generated based on the system actively or passively monitoring.

The user profile may also include one or more behavior characteristics and/or account characteristics. As referred to herein, a "behavior characteristic" may include any characteristic that indicates likely user behavior when interacting with user interfaces. For example, the behavior characteristic may indicate an average number of user input fields and/or an average number of user interface pages that a user normally interacts with. In another example, the behavior characteristic may indicate an average number of user input fields and/or an average number of user interface pages that a user normally completes. In another example, the behavior characteristic may indicate a maximum number of user input fields and/or a maximum number of user interface pages that a user normally interacts with. For example, the system may use a behavior characteristic to determine an optimal number of user input fields and/or interface pages that will result in a user completing the user interface. For example, the system may generate a user interface comprising the preferred number of user input fields and the preferred number of user interface pages for each user.

The user profile may also include an account characteristic. As referred to herein, an "account characteristic" may include any characteristic that indicates the status of one or more categories of a user account. For example, the account characteristic may include a value and/or presence of a value that may correspond to, or weigh on, a value corresponding to a template requirement for a user interface. For example, the system may parse account characteristics (or values in a user profile that may correspond to an account characteristic) to meet one or more template requirements. The system may then use this information to adjust the number of user input fields and/or number of user interface pages. For example, if a template has twenty different requirements, and ten may be satisfied by account characteristics from a user profile, the system may only generate ten user input fields (e.g., corresponding to the unsatisfied requirements).

The system may also use account characteristics from a user profile to determine an order of user input fields (or an order of categories corresponding to user input fields). For example, the system may determine that one or more categories of account characteristics are available from the user profile. Additionally or alternatively, the system may determine that the presence of these account characteristics indicate that the user likely has (or does not have) other characteristics. The system may organize the modular components of the user interface template to prioritize receiving information about these other characteristics. For example, if a template requirement requires a user to have current employment, but the user profile indicates that there is no current employer (or there is no current income), the system may prioritize verifying this information first (e.g., by generating a user input field corresponding to this category first).

FIG. 1 shows user interface 100. User interface 100 includes content having a plurality of modular components. As referred to herein, a "modular component" may comprise any of the more or less distinct parts into which the content may be divided, or from which the content is made up. For example, a modular component may be distinguished from another modular component by one or more modular component characteristics. In user interface 100, the system may identify a modular component of the plurality of modular components as having a modular component characteristic. The modular component characteristic may correspond to a category corresponding to a template requirement.

A modular component characteristic may comprise any characteristic that distinguishes one modular component from another. For example, a modular component characteristic may be media-related information (e.g., ordering, heading information, titles, descriptions, ratings information (e.g., parental control ratings, critic's ratings, etc.), source code data (e.g., HTML, source code headers, etc.), genre or category information, subject matter information, author/actor information, logo data, or other identifiers for the content provider), media format, file type, object type, objects appearing in the content (e.g., product placements, advertisements, keywords, context), or any other suitable information used to distinguish one modular component from another. In some embodiments, the modular component characteristic may also be human-readable text. The modular component characteristic may be determined to be indicative of the modular component being of interest to the user based on a comparison of the modular component characteristic and user profile data for the user.

For example, user interface 100 may include modular component 102. The system may identify modular component 102 based on a paragraph, modular component break, and/or an HTML tag. The system may parse the modular component for a content characteristic (e.g., content characteristic) and metadata describing the content characteristic, wherein the metadata indicates the context of the content characteristic, and wherein the content characteristic comprises human-readable text. For example, as shown in user interface 100, the system may identify a content characteristic. As referred to herein, a "content characteristic" may comprise any of the more or less distinct parts into which the modular component may be divided, or from which the modular component is made up. For example, a content characteristic can be anything that may distinguish one content characteristic from another. In some embodiments, content characteristic may be human-readable text. For example, the content characteristic may be a keyword, an image, an embedded object and/or other graphical characteristics.

The system may also generate a page (e.g., page 104). The system may determine a number, shape, size, or other graphical characteristics for each page. For example, each page (e.g., page 104) may include one or more page characteristics. As referred to herein, a page characteristic may include any characteristic that distinguishes one page from another. For example, the page characteristic may include the look or feel of a page, a number of user input fields, a size, font, space between fields, etc.

Additionally, the system may generate a content map for the modular component based on the parsing, wherein the content map indicates a position of the modular component. For example, the content map may include each location of a given modular component with the distances and/or positions indicated. For example, the system may determine a CSS position property for each characteristic. In another example, the system may use HTML absolute positioning to define a content map. The system may then apply the content map to a page to generate the user interface template. The system may repeat this process for each page. Additionally or alternatively, the system may repeat this process as user input is received, and/or a user input field and/or page is completed. For example, upon each input, completed page, etc., the system may transmit a request to server 130. Server 130 may then generate a new page (or series of pages), each with determining modular components for generation. For example, as shown in FIG. 1, based on information entering into user interface 100, the system has generated user interface 150. User interface 150 includes modular component 152 and page 154, which have been selected and/or organized based on the previous user inputs.

The system may then generate a feature input based on the content map, modular components, and/or other metadata, wherein the feature input comprises a vector array of values indicative of the content map, modular components, and/or other metadata. For example, the system may use a generative adversarial network, wherein the generative adversarial network is trained to generate outputs of alternative modular components (e.g., modular component 152), wherein the alternative modular components correspond to content maps and have alternative content characteristics at predetermined positions.

FIG. 2 shows an illustrative user interface based on selected modular components, in accordance with one or more embodiments. FIG. 2 shows user interface 200. User interface 200 includes content having a plurality of modular components similar to user interface 100. In user interface 200, the system may replace a modular component from the original content (e.g., modular component 102) with another modular component (e.g., modular component 202). For example, as described below, the system may replace a modular component of the original content with an alternative modular component. For example, the system may input the feature input into a generative adversarial network, wherein the generative adversarial network is trained to generate an output of an alternative modular component (e.g., modular component 202), wherein the alternative modular component corresponds to the content map, and has an alternative content characteristic at the position. For example, alternative modular component 152 may correspond to modular component 102). User interface 200 also shows additional alternative modular component 202, which is a modular component not included in the original content. Alternative modular component 202 may be located at a point outside the original content map, but the system may be anchored to alternative modular component 202. In some embodiments, the system may generate for display alternative modular component 202, as well as additional alternative modular components (e.g., alternative modular component 204).

FIG. 3 shows illustrative system components for using machine learning models to organize and select modular components for user interface templates, in accordance with one or more embodiments. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, other computing equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, those operations may, in some embodiments, be performed by other components of system 300. As an example, while one or more operations are described herein as being performed by components of mobile device 322, those operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational responses, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device, such as a computer screen, and/or a dedicated input device, such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may be a database configured to store user data for a user. For example, the database may include user data that the system has collected about the user through prior interactions, both actively and passively. For example, the user data may describe one or more characteristics about a user, a user device, and/or one or more interactions of the user with a user device and/or application generating responses, queries, and/or notifications. Alternatively, or additionally, the system may act as a clearing house for multiple sources of information about the user. This information may be compiled into a user profile. Cloud components 310 may also include control circuitry configured to perform the various operations needed to generate alternative content. For example, the cloud components 310 may include cloud-based storage circuitry configured to generate alternative content. Cloud components 310 may also include cloud-based control circuitry configured to run processes to determine alternative content. Cloud components 310 may also include cloud-based input/output circuitry configured to display alternative content.

Cloud components 310 may include model 302, which may be a machine learning model (e.g., as described in FIG. 3). Model 302 may take inputs 304 and provide outputs 306. The inputs may include multiple datasets, such as a training dataset and a test dataset. Each of the plurality of datasets (e.g., inputs 304) may include data subsets related to user data, predicted intents, and/or actual intents. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction.

In another embodiment, model 302 may update its configurations (e.g., weights, biases, or other parameters) based on the assessment of its prediction (e.g., outputs 306) and reference feedback information (e.g., user indication of accuracy, reference labels, or other information). In another embodiment, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass before it propagates to other neural units. Model 302 may be self-learning and trained, rather than explicitly programmed, and can perform significantly better in certain areas of problem solving as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., a user intent).

In some embodiments, model 302 may predict alternative content. For example, the system may determine that particular characteristics are more likely to be indicative of a prediction. In some embodiments, the model (e.g., model 302) may automatically perform actions based on outputs 306. In some embodiments, the model (e.g., model 302) may not perform any actions on a user's account. The output of the model (e.g., model 302) is only used to decide which location and/or delivery time offset to select.

System 300 also includes API layer 350. In some embodiments, API layer 350 may be implemented on user device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract called WSDL that describes the services in terms of their operations and the data types used to exchange information. REST APIs do not typically have this contract; instead, they are documented with client libraries for most common languages including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layers and Back-End Layers, where microservices reside. In this kind of architecture, the role of the API layer 350 may be to provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

Figure 4:
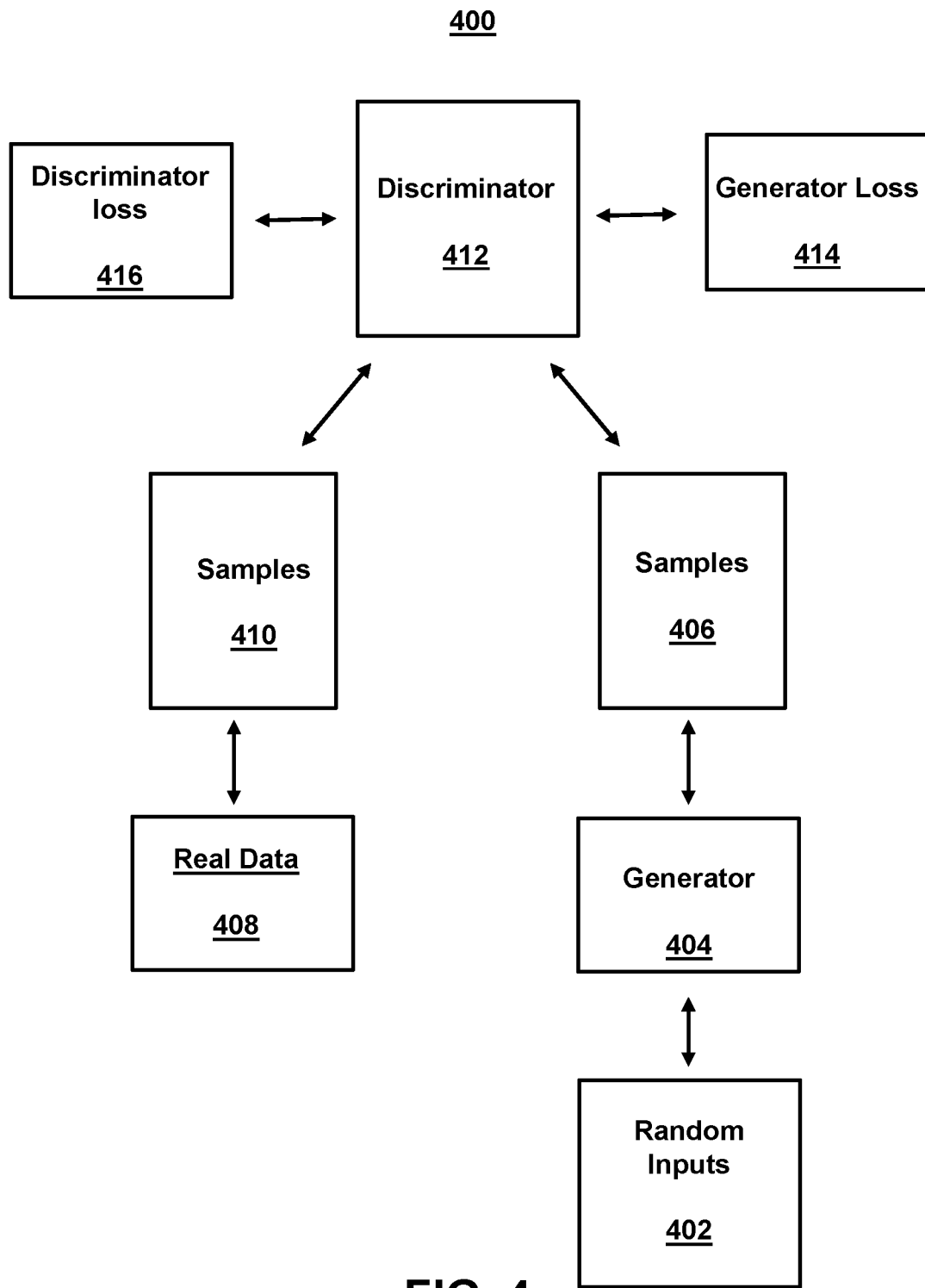
FIG. 4 shows illustrative model architecture for a machine learning model used to organize and select modular components for user interface templates, in accordance with one or more embodiments.

FIG. 4 shows illustrative model architecture for a machine learning model used to organize and select modular components for user interface templates, in accordance with one or more embodiments. The system may be trained to generate the preferred number of user input fields and/or the preferred number of user interface pages. For example, the machine learning model is trained to: determine a plurality of categories of account characteristics required to be populated to meet the template requirements; filter the plurality of categories based on whether any of the plurality of categories is populated by known account characteristics for user accounts retrieved from user profiles; and determine for the filtered plurality of categories a number of user input fields and a number of user interface pages based on known behavior characteristics for user accounts retrieved from user profiles.

For example, FIG. 4 comprises system 400. System 400 may be used to generate alternative modular components and/or pages using generative adversarial networks implemented in an application programming interface layer. System 400, which may comprise a generative adversarial network, may include various modular components and/or pages. For example, system 400 may include random inputs 402, which are fed into generator 404 to generate samples 406. Similarly, real data 408 may generate samples 410. Samples 406 and samples 410 may be fed into discriminator 412. Outputs from discriminator 412 may include discriminator loss 416 and generator loss 414.

For example, in system 400, both generator 404 and discriminator 412 may be neural networks. Generator 404 outputs may be connected directly to an input for discriminator 412. Through backpropagation, a classification from discriminator 412 provides a signal that generator 404 uses to update its weights. The back-propagation may comprise fine-tuning the weights used by system 400 (and/or generator 404 or discriminator 412) based on the error rate obtained in the previous epoch (i.e., iteration). Proper tuning of the weights allows system 400 to reduce error rates.

For example, generator 404 may generate new data instances. Discriminator 412 discriminates between different kinds of data instances. A generative adversarial network is a type of generative model. For example, given a set of data instances X and a set of labels Y, generator 404 may capture the joint probability $p(X, Y)$, or just $p(X)$ if there are no labels, whereas discriminator 412 captures the conditional probability $p(Y|X)$.

Discriminator 412 may be a classifier that distinguishes real data (e.g., samples 410) from the data created by generator 404 (e.g., samples 406). For example, discriminator 412 may use samples 410 as positive examples during training. Discriminator 412 may use samples 410 as negative examples during training. In system 400, discriminator 412 connects to two loss functions (e.g., discriminator loss 416 and generator loss 414). During discriminator 412 training, discriminator 412 ignores generator loss 414, and uses discriminator loss 416.

During discriminator 412 training, discriminator 412 classifies both real data and fake data from generator 404. Discriminator loss 216 penalizes discriminator 212 for misclassifying a real instance (e.g., samples 210) as fake, or a fake instance (e.g., samples 206) as real. Discriminator 212 updates its weights through backpropagation from discriminator loss 216 through the discriminator network. Generator 404 of system 400 learns to create fake data by incorporating feedback from discriminator 412 (e.g., it learns to make discriminator 412 classify its output as real). In some embodiments, generator 404 training requires tighter integration between generator 404 and discriminator 412 than discriminator training requires. For example, system 400 trains generator 404 using random inputs 402.

As generator 404 improves with training, discriminator 412's performance gets worse because discriminator 412 cannot easily tell a difference between samples 410 and samples 406. If generator 404 succeeds, then discriminator 412 may have a 50% accuracy. Accordingly, generator 404 attempts to maximize generator loss 414.

System 400 provides significant advantages over conventional machine learning. Specifically, the system may process both text and image data. First, system 400 includes architecture and training strategy that enables compelling text to image synthesis. For example, system 400 may train on a subset of training categories (e.g., subsets within samples 406 and 410), wherein the subsets are linked to specific characteristics (e.g., section and/or content). For example, system 400 consists of generator 404 and discriminator 412 that compete in a two player minimax game for each subset of training categories. For example, for each subset, discriminator 412 tries to distinguish real training data for each subset (e.g., samples 410) from synthetic data for each subset (e.g., samples 406), and generator 404 tries to fool discriminator 412. For example, system 400 may include text encoders/decoders and image encoders/decoders for each subset.

System 400 may be trained on subset features encoded by a hybrid character-level convolutional recurrent neural network. Both generator 404 and discriminator 412 perform feed-forward inferences conditioned on the subset feature. In system 400, discriminator 412 observes two kinds of inputs: real images with matching text, and synthetic images with arbitrary text. System 400 implicitly separates two sources of error: unrealistic images (for any text), and realistic images of the wrong class that mismatch the conditioning information. System 400 separates these error sources. For example, in addition to the real/fake inputs to discriminator 412 during training, system 400 adds a third type of input consisting of real images with mismatched text, which discriminator 412 learns to score as fake. By learning to optimize image/text matching in addition to the image realism, discriminator 412 provides an additional signal to the generator.

It should be noted that additionally or alternatively, the system may use variational autoencoders to generate content. For example, a variational autoencoder provides a probabilistic manner for describing an observation in latent space. As such, instead of using an encoder which outputs a single value to describe each latent state attribute, the system may determine a probability distribution for each latent attribute. To describe the observation in a probabilistic manner, the system determines a probability distribution for each latent attribute. During decoding from the latent state, the system randomly samples from each latent state distribution to generate a vector as input for the decoder. Accordingly, the variational autoencoder provides a model that outputs a range of possible values (e.g., a statistical distribution). These values can then be randomly sampled by the decoder. This creates a continuous, smooth latent space representation in which values that are nearby to one another in latent space create similar reconstructions.

Figure 5:
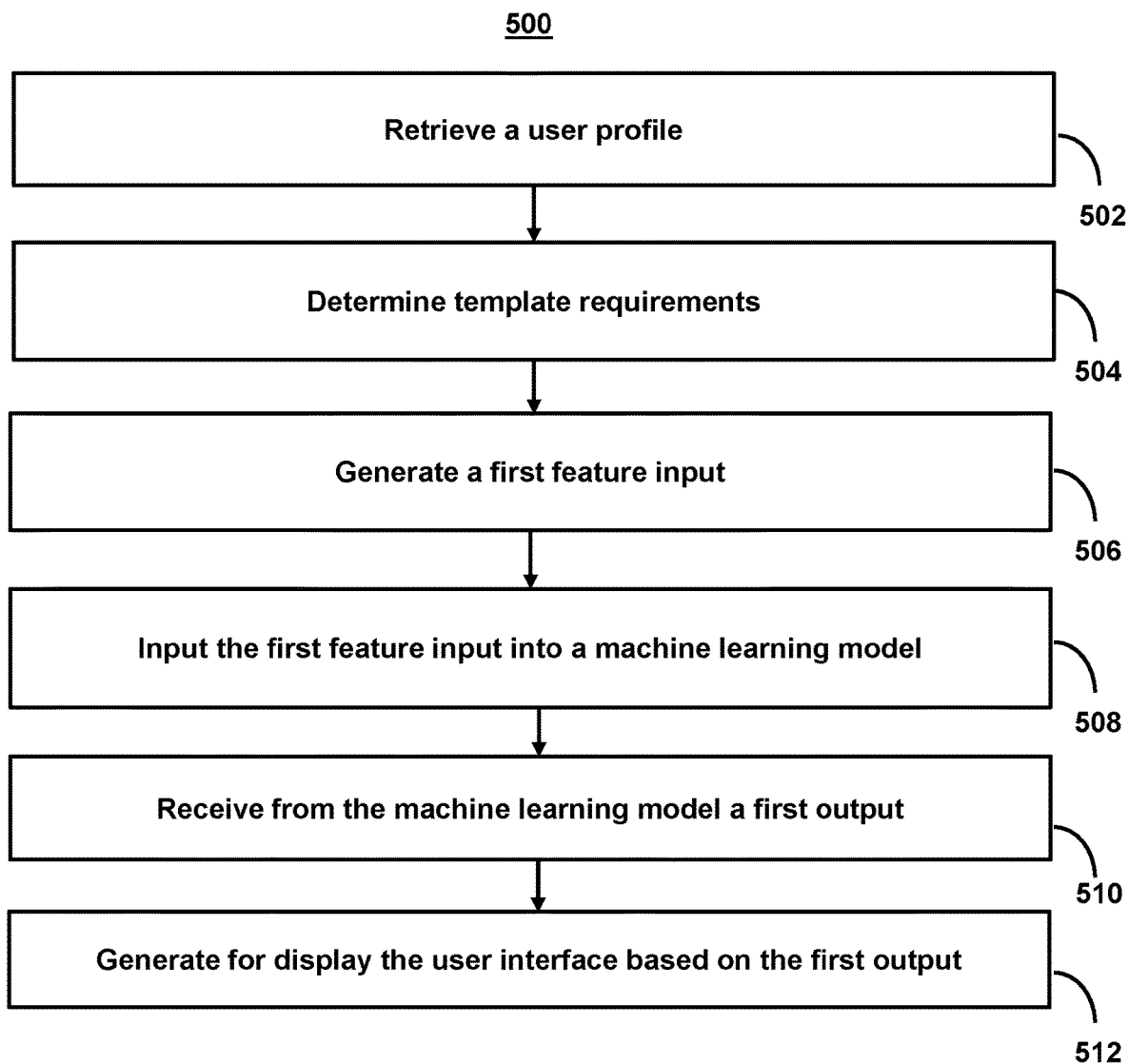
FIG. 5 shows a flowchart of the steps involved in using machine learning models to organize and select modular components for user interface templates, in accordance with one or more embodiments.

FIG. 5 shows a flowchart of the steps involved in using machine learning models to organize and select modular components for user interface templates, in accordance with one or more embodiments. For example, the system may use process 500 (e.g., as implemented on one or more system components) in order to organize and select modular components for user interface templates.

At step 502, process 500 (e.g., using one or more components described in system 300 (FIG. 3)) retrieves a user profile. For example, the system may retrieve a user profile corresponding to a user account for a user, wherein the user profile includes a behavior characteristic and an account characteristic, wherein the behavior characteristic indicates likely user behavior when interacting with user interfaces, and wherein the account characteristic indicates the current status of a category of information of the user account.

In some embodiments, the system may receive multiple user profiles and/or aggregate information from multiple profiles together. For example, the system may retrieve a first additional user profile corresponding to the user account from a third party microservice. The system may retrieve a second additional user profile corresponding to the user account from a website cookie. The system may aggregate information from the user profile, the first additional user profile, and the second additional user profile.

At step 504, process 500 (e.g., using one or more components described in system 300 (FIG. 3)) determines template requirements. For example, the system may determine template requirements for a user interface.

At step 506, process 500 (e.g., using one or more components described in system 300 (FIG. 3)) generates a first feature input. For example, the system may generate a first feature input based on the user profile and the template requirements. For example, the feature input may be a vectorized array of data.

At step 508, process 500 (e.g., using one or more components described in system 300 (FIG. 3)) inputs the first feature input into a machine learning model. For example, the machine learning model (which may comprise a generative adversarial network) may be trained to: determine a plurality of categories of account characteristics required to be populated to meet the template requirements; filter the plurality of categories based on whether any of the plurality of categories is populated by known account characteristics for user accounts retrieved from user profiles; and determine for the filtered plurality of categories a number of user input fields and a number of user interface pages based on known behavior characteristics for user accounts retrieved from user profiles.

For example, the machine learning model may be trained to determine a first category of the plurality of categories at which the user likely stops completing user interfaces, and filter the plurality of categories based on the first category. Additionally or alternatively, the machine learning model is further trained to determine respective probabilities of various orders of input fields at which the user likely stops completing user interfaces, wherein the first output indicates a preferred order of user input fields, and wherein the user interface comprises the preferred number of user input fields and the preferred number of user interface pages in the preferred order. Additionally or alternatively, the machine learning model is further trained to determine respective probabilities of various orders of pages at which the user likely stops completing user interfaces, wherein the first output indicates a preferred order of pages, and wherein the user interface comprises the preferred number of user input fields and the preferred number of user interface pages in the preferred order of pages.

In some embodiments, the system may determine the number of user input fields and the number of user interface pages based on known behavior characteristics for user accounts retrieved from user profiles. For example, the system may determine the number of user input fields and the number of user interface pages with a predetermined probability of completion by a user corresponding to the user account.

For example, when determining the number of user input fields and the number of user interface pages with the predetermined probability of completion by the user corresponding to the user account, the system may determine a first number of user input fields at which the user likely stops completing user interfaces. The system may then determine a first number of user interface pages at which the user likely stops completing user interfaces. The system may then determine the preferred number of user input fields and the preferred number of user interface pages based on the first number of user input fields and the first number of user interface pages.

In some embodiments, when determining a first number of user input fields at which the user likely stops completing user interfaces, the system may determine a first number of user interface pages at which the user likely stops completing user interfaces. The system may then determine the preferred number of user input fields and the preferred number of user interface pages based on the first number of user input fields and the first number of user interface pages.

For example, when determining the number of user input fields and the number of user interface pages with the predetermined probability of completion by the user corresponding to the user account, the system may determine a respective probability corresponding to each number of user input fields at which the user likely stops completing user interfaces. The system may determine a respective probability corresponding to each number of user interface pages at which the user likely stops completing user interfaces. The system may determine the preferred number of user input fields and the preferred number of user interface pages based on the respective probability corresponding to each number of user input fields and the respective probability corresponding to each number of user interface pages.

In some embodiments, the system may continuously update the modular components and/or pages as a user inputs data and completes a user input field and/or page. For example, the system may receive a user input into the user interface. The system may generate a second feature input based on the user input, the user profile, or the template requirements. The system may input the second feature input into the machine learning model. The system may receive from the machine learning model a second output. The system may update the user interface based on the second output (e.g., the system may generate user interface 150 (FIG. 1)).

At step 510, process 500 (e.g., using one or more components described in system 300 (FIG. 3)) receives from the machine learning model a first output. For example, the system may receive from the machine learning model a first output wherein the first output indicates, based on the first feature input, a preferred number of user input fields and a preferred number of user interface pages.

At step 512, process 500 (e.g., using one or more components described in system 300 (FIG. 3)) generates for display the user interface based on the first output. For example, the system may generate for display, on a user device, the user interface comprising the preferred number of user input fields and the preferred number of user interface pages.

In some embodiments, the system may continue to use machine learning models to organize and select modular components for user interface templates each time a user completes an input into a field or finishes a page. For example, the system may receive a user input into the user interface. The system may generate a second feature input based on the user input, the user profile, or the template requirements. The system may then input the second feature input into the machine learning model. The system may receive from the machine learning model a second output. The system may then update the user interface based on the second output.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-3 could be used to perform one or more of the steps in FIG. 5.

The above-described embodiments of the present disclosure are presented for purposes of illustration, and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for using machine learning models to organize and select modular components for user interface templates, the method comprising: retrieving a user profile corresponding to a user account for a user, wherein the user profile includes a behavior characteristic and an account characteristic, wherein the behavior characteristic indicates likely user behavior when interacting with user interfaces, and wherein the account characteristic indicates a current status of a category of information of the user account; determining template requirements for a user interface; generating a first feature input based on the user profile and the template requirements; inputting the first feature input into a machine learning model, wherein the machine learning model is trained to: determine a plurality of categories of account characteristics required to be populated to meet the template requirements; filter the plurality of categories based on whether any of the plurality of categories is populated by known account characteristics for user accounts retrieved from user profiles; determine for the filtered plurality of categories a number of user input fields and a number of user interface pages based on known behavior characteristics for user accounts retrieved from user profiles; receiving from the machine learning model a first output, wherein the first output indicates, based on the first feature input, a preferred number of user input fields and a preferred number of user interface pages; and generating for display, on a user device, the user interface comprising the preferred number of user input fields and the preferred number of user interface pages.

2. The method of embodiment 1, further comprising: receiving a user input into the user interface; generating a second feature input based on the user input, the user profile, and the template requirements; inputting the second feature input into the machine learning model; receiving from the machine learning model a second output; and updating the user interface based on the second output.

3. The method of any one of the preceding embodiments, wherein determining for the filtered plurality of categories the number of user input fields and the number of user interface pages based on known behavior characteristics for user accounts retrieved from user profiles, further comprising, determining the number of user input fields and the number of user interface pages with a predetermined probability of completion by a user corresponding to the user account.

4. The method of any one of the preceding embodiments, wherein determining the number of user input fields and the number of user interface pages with the predetermined probability of completion by the user corresponding to the user account comprises: determining a first number of user input fields at which the user likely stops completing user interfaces; determining a first number of user interface pages at which the user likely stops completing user interfaces; and determining the preferred number of user input fields and the preferred number of user interface pages based on the first number of user input fields and the first number of user interface pages.

5. The method of any one of the preceding embodiments, wherein determining the number of user input fields and the number of user interface pages with the predetermined probability of completion by the user corresponding to the user account comprises: determining a respective probability corresponding to each number of user input fields at which the user likely stops completing user interfaces; determining a respective probability corresponding to each number of user interface pages at which the user likely stops completing user interfaces; and determining the preferred number of user input fields and the preferred number of user interface pages based on the respective probability corresponding to each number of user input fields and the respective probability corresponding to each number of user interface pages.

6. The method of any one of the preceding embodiments, wherein the machine learning model is further trained to generate graphical characteristics for input fields in the user interface.

7. The method of any one of the preceding embodiments, wherein the machine learning model is further trained to: determine a first category of the plurality of categories at which the user likely stops completing user interfaces; and filter the plurality of categories based on the first category.

8. The method of any one of the preceding embodiments, wherein the machine learning model is further trained to: determine respective probabilities of various orders of input fields at which the user likely stops completing user interfaces, wherein the first output indicates a preferred order of user input fields, and wherein the user interface comprises the preferred number of user input fields and the preferred number of user interface pages in the preferred order.

9. The method of any one of the preceding embodiments, wherein the machine learning model is further trained to: determine respective probabilities of various orders of pages at which the user likely stops completing user interfaces, wherein the first output indicates a preferred order of pages, and wherein the user interface comprises the preferred number of user input fields and the preferred number of user interface pages in the preferred order of pages.

10. The method of any one of the preceding embodiments, further comprising: retrieving a first additional user profile corresponding to the user account from a third party microservice; retrieving a second additional user profile corresponding to the user account from a website cookie; and aggregating information from the user profile, the first additional user profile, and the second additional user profile.

11. A tangible, non-transitory, machine-readable medium storing instructions that, when executed by a data processing apparatus, cause the data processing apparatus to perform operations comprising those of any of embodiments 1-10.

12. A system comprising: one or more processors; and memory storing instructions that, when executed by the processors, cause the processors to effectuate operations comprising those of any of embodiments 1-10.

13. A system comprising means for performing any of embodiments 1-10.

What is claimed is:

1. A system for using machine learning models to organize and select modular components for user interface templates, the system comprising:

cloud-based storage circuitry for storing a user profile corresponding to a user account; cloud-based control circuitry for:
  retrieving the user profile corresponding to the user account, wherein the user profile includes a behavior characteristic, and wherein the behavior characteristic indicates likely user behavior when interacting with user interfaces;
  determining template requirements for a user interface, wherein the template requirements include a plurality of predetermined categories of information about a user that is required;
  generating a first feature input based on the user profile and the template requirements;
  inputting the first feature input into a machine learning model, wherein the machine learning model is trained to determine a plurality of categories of account characteristics required to be populated to meet the template requirements;
  receiving from the machine learning model a first output, wherein the first output indicates, based on the first feature input, a preferred number of user input fields and a preferred number of user interface pages; and
cloud-based control circuitry for generating for display, on a user device, the user interface comprising the preferred number of user input fields and the preferred number of user interface pages, wherein the preferred number of user input fields are arranged as modular components on each page of the preferred number of user interface pages.

2. A method for using machine learning models to organize and select modular components for user interface templates, the method comprising:
  retrieving a user profile corresponding to a user account for a user, wherein the user profile includes a behavior characteristic, and wherein the behavior characteristic indicates likely user behavior when interacting with user interfaces;
  determining template requirements for a user interface;
  generating a first feature input based on the user profile and the template requirements;
  inputting the first feature input into a machine learning model, wherein the machine learning model is trained to determine a number of user input fields or a number of user interface pages based on known behavior characteristics for user accounts retrieved from user profiles;
  receiving from the machine learning model a first output, wherein the first output indicates, based on the first feature input, a preferred number of user input fields and a preferred number of user interface pages; and
  generating for display, on a user device, the user interface comprising the preferred number of user input fields and the preferred number of user interface pages.

3. The method of claim 2, further comprising:
receiving a user input into the user interface;
generating a second feature input based on the user input, the user profile, the template requirements;
inputting the second feature input into the machine learning model;
receiving from the machine learning model a second output; and
updating the user interface based on the second output.

4. The method of claim 2, wherein determining the number of user input fields or the number of user interface pages further comprises determining the number of user input fields and the number of user interface pages with a predetermined probability of completion by a user corresponding to the user account.

5. The method of claim 4, wherein determining the number of user input fields or the number of user interface pages with the predetermined probability of completion by the user corresponding to the user account comprises:
  determining a first number of user input fields at which the user likely stops completing user interfaces;
  determining a first number of user interface pages at which the user likely stops completing user interfaces; and
  determining the preferred number of user input fields and the preferred number of user interface pages based on the first number of user input fields and the first number of user interface pages.

6. The method of claim 4, wherein determining the number of user input fields or the number of user interface pages with the predetermined probability of completion by the user corresponding to the user account comprises:
  determining a respective probability corresponding to each number of user input fields at which the user likely stops completing user interfaces;
  determining a respective probability corresponding to each number of user interface pages at which the user likely stops completing user interfaces; and
  determining the preferred number of user input fields and the preferred number of user interface pages based on the respective probability corresponding to each number of user input fields, and the respective probability corresponding to each number of user interface pages.

7. The method of claim 2, wherein the machine learning model is further trained to generate graphical characteristics for input fields in the user interface.

8. The method of claim 2, wherein the machine learning model is further trained to:
  determine a first category of a plurality of categories at which the user likely stops completing user interfaces; and
  filter the plurality of categories based on the first category.

9. The method of claim 2, wherein the machine learning model is further trained to:
  determine respective probabilities of various orders of input fields at which the user likely stops completing user interfaces, wherein the first output indicates a preferred order of user input fields, and wherein the user interface comprises the preferred number of user input fields and the preferred number of user interface pages in the preferred order.

10. The method of claim 2, wherein the machine learning model is further trained to:
  determine respective probabilities of various orders of pages at which the user likely stops completing user interfaces, wherein the first output indicates a preferred order of pages, and wherein the user interface comprises the preferred number of user input fields and the preferred number of user interface pages in the preferred order of pages.

11. The method of claim 2, further comprising:
  retrieving a first additional user profile corresponding to the user account from a third party microservice;
  retrieving a second additional user profile corresponding to the user account from a website cookie; and
  aggregating information from the user profile, the first additional user profile, and the second additional user profile.

12. A non-transitory, computer readable medium for using machine learning models to organize and select modular components for user interface templates comprising instructions that when executed on one or more processors cause operations comprising:
  retrieving a user profile corresponding to a user account for a user, wherein the user profile includes a behavior characteristic, and wherein the behavior characteristic indicates likely user behavior when interacting with user interfaces;
  determining template requirements for a user interface;
  generating a first feature input based on the user profile and the template requirements;
  inputting the first feature input into a machine learning model, wherein the machine learning model is trained to determine a number of user input fields and a number of user interface pages based on known behavior characteristics for user accounts retrieved from user profiles;
  receiving from the machine learning model a first output, wherein the first output indicates, based on the first feature input, a preferred number of user input fields and a preferred number of user interface pages; and
  generating for display, on a user device, the user interface comprising the preferred number of user input fields and the preferred number of user interface pages.

13. The non-transitory, computer readable medium of claim 12, further comprising: receiving a user input into the user interface;
  generating a second feature input based on the user input, the user profile, the template requirements;
  inputting the second feature input into the machine learning model;
  receiving from the machine learning model a second output; and
  updating the user interface based on the second output.

14. The non-transitory, computer readable medium of claim 12, wherein determining the number of user input fields or the number of user interface pages further comprises determining the number of user input fields and the number of user interface pages with a predetermined probability of completion by a user corresponding to the user account.

15. The non-transitory, computer readable medium of claim 14, wherein determining the number of user input fields and the number of user interface pages with the predetermined probability of completion by the user corresponding to the user account comprises:
  determining a first number of user input fields at which the user likely stops completing user interfaces;
  determining a first number of user interface pages at which the user likely stops completing user interfaces; and
  determining the preferred number of user input fields and the preferred number of user interface pages based on the first number of user input fields and the first number of user interface pages.

16. The non-transitory, computer readable medium of claim 14, wherein determining the number of user input fields and the number of user interface pages with the predetermined probability of completion by the user corresponding to the user account comprises:
  determining a respective probability corresponding to each number of user input fields at which the user likely stops completing user interfaces;
  determining a respective probability corresponding to each number of user interface pages at which the user likely stops completing user interfaces; and
  determining the preferred number of user input fields and the preferred number of user interface pages based on the respective probability corresponding to each number of user input fields and the respective probability corresponding to each number of user interface pages.

17. The non-transitory, computer readable medium of claim 12, wherein the machine learning model is further trained to generate graphical characteristics for input fields in the user interface.

18. The non-transitory, computer readable medium of claim 12, wherein the machine learning model is further trained to:
  determine a first category of a plurality of categories at which the user likely stops completing user interfaces; and
  filter the plurality of categories based on the first category.

19. The non-transitory, computer readable medium of claim 12, wherein the machine learning model is further trained to:
  determine respective probabilities of various orders of input fields at which the user likely stops completing user interfaces, wherein the first output indicates a preferred order of user input fields, and wherein the user interface comprises the preferred number of user input fields and the preferred number of user interface pages in the preferred order.

20. The non-transitory, computer readable medium of claim 12, wherein the machine learning model is further trained to:
  determine respective probabilities of various orders of pages at which the user likely stops completing user interfaces, wherein the first output indicates a preferred order of pages, and wherein the user interface comprises the preferred number of user input fields and the preferred number of user interface pages in the preferred order of pages.

* * * * *